US00RE40473E

(19) United States
(12) Reissued Patent
Osborn et al.

(10) Patent Number: US RE40,473 E
(45) Date of Reissued Patent: Aug. 26, 2008

(54) DYNAMIC PERFORMANCE ADJUSTMENT OF COMPUTATION MEANS

(75) Inventors: Neal Osborn, Milpitas, CA (US); Francis J. Canova, Fremont, CA (US)

(73) Assignee: Palm, Inc., Sunnyvale, CA (US)

(21) Appl. No.: 11/403,243
(22) Filed: Apr. 12, 2006

Related U.S. Patent Documents

Reissue of:
(64) Patent No.: 6,721,892
Issued: Apr. 13, 2004
Appl. No.: 09/569,596
Filed: May 9, 2000

(51) Int. Cl.
*G06F 1/26* (2006.01)

(52) U.S. Cl. ..... 713/300; 713/310; 713/320; 713/321; 713/322; 713/323; 713/324; 702/146; 702/182; 714/47; 465/574

(58) Field of Classification Search ..... 713/300
See application file for complete search history.

(56) References Cited

U.S. PATENT DOCUMENTS

| | | | | | |
|---|---|---|---|---|---|
| 5,021,679 | A | | 6/1991 | Fairbanks et al. | 307/66 |
| 5,153,535 | A | | 10/1992 | Fairbanks et al. | 331/143 |
| 5,300,831 | A | * | 4/1994 | Pham et al. | 326/44 |
| 5,307,003 | A | | 4/1994 | Fairbanks et al. | 323/222 |
| 5,373,254 | A | | 12/1994 | Nakauchi et al. | 331/1 |
| 5,392,437 | A | | 2/1995 | Matter et al. | 395/750 |
| 5,495,617 | A | | 2/1996 | Yamada | 395/750 |
| 5,557,551 | A | | 9/1996 | Craft | 364/557 |
| 5,627,412 | A | | 5/1997 | Beard | 307/82 |
| 5,719,800 | A | | 2/1998 | Mittal et al. | 364/707 |
| 5,752,011 | A | | 5/1998 | Thomas et al. | 395/556 |
| 5,766,228 | A | | 6/1998 | Bonnet et al. | 607/16 |
| 5,774,704 | A | * | 6/1998 | Williams | 713/501 |
| 5,787,011 | A | * | 7/1998 | Ko | 716/2 |
| 5,815,693 | A | | 9/1998 | McDermott et al. | 395/556 |
| 5,815,724 | A | | 9/1998 | Mates | 395/750.04 |
| 5,822,369 | A | | 10/1998 | Araki | 375/237 |
| 5,964,881 | A | | 10/1999 | Thor | 713/501 |
| 5,974,557 | A | | 10/1999 | Thomas et al. | 713/322 |
| 6,029,006 | A | | 2/2000 | Alexander et al. | 395/750.05 |
| 6,078,356 | A | | 6/2000 | Jensen | 348/164 |
| 6,167,524 | A | * | 12/2000 | Goodnow et al. | 713/300 |
| 6,192,479 | B1 | | 2/2001 | Ko | 713/300 |
| 6,211,740 | B1 | | 4/2001 | Dai et al. | 331/2 |
| 6,216,235 | B1 | | 4/2001 | Thomas et al. | 713/501 |
| 6,219,796 | B1 | | 4/2001 | Bartley | 713/320 |
| 6,219,797 | B1 | | 4/2001 | Liu et al. | 713/500 |
| 6,255,974 | B1 | * | 7/2001 | Morizio et al. | 341/143 |
| 6,272,642 | B2 | | 8/2001 | Pole, II et al. | 713/300 |
| 6,407,595 | B1 | | 6/2002 | Huang et al. | 327/114 |
| 6,484,041 | B1 | * | 11/2002 | Aho et al. | 455/574 |
| 6,559,631 | B1 | | 5/2003 | Balch et al. | 324/142 |

* cited by examiner

*Primary Examiner*—Nitin C. Patel

(57) ABSTRACT

A dynamic performance circuit adjustment system and method that flexibly adjusts the performance of a logic circuit. The dynamic performance circuit adjustment system and method facilitates flexible power conservation. In one exemplary implementation, a dynamic performance adjustment control circuit controls performance adjustments to a logic circuit (e.g., a processor) and adjusts support functions for the logic circuit. The logic circuit performs operational functions (e.g., processing) or tasks that have different performance requirements. For example, some tasks performed by the logic circuit are required to be performed in a relatively short duration of time and other tasks performed by logic circuit have relatively longer time limitations. The dynamic performance adjustment control circuit adjusts the clock frequency and voltage at which the logic circuit operates to a relatively greater frequency and voltage for tasks required to be performed in a shorter duration of time and adjusts the frequency and voltage at which the logic circuit operates to a relatively lower frequency and voltage for tasks with longer timing tolerances. The dynamic performance adjustment system and method includes provisions to manage a transition in performance and support functions in a manner that reduces the risk of spurious signals or "glitches."

17 Claims, 9 Drawing Sheets

100

300

600

| TASK | FREQUENCY | VOLTAGE |
|---|---|---|
| 1 | MAX | MAX |
| 2 | REL. HIGH | REL. HIGH |
| 3 | REL. LOW | REL. LOW |
| 4 | MAX/OFF | MAX/OFF |
| 5 | OFF | OFF |
| 6 | REL. HIGH | REL. HIGH |
| 7 | REL. LOW | REL. LOW |

FIGURE 6

DYNAMIC PERFORMANCE ADJUSTMENT OF COMPUTATION MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of computer performance maximization. More particularly, the present invention relates to managing processor performance in a handheld computer with a flexible control system and method that is dynamically adaptable to achieve conservation of limited energy and power resources.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Typically, electronic systems designed to produce these results consume power and energy resources for these devices, such as battery power sources in portable handheld devices (e.g., a palmtop computer), are often limited and expended quickly. Traditional attempts to conserve energy are typically limited and do not facilitate efficient energy conservation when power demands are greater than zero but less than a maximum.

Electronic systems typically perform a wide range of tasks with highly differentiated processing needs. Numerous processor based electronic systems operate at differing processing requirements or ranges. For example, a handheld computer (such as a Palm VII Connector Organizer) performing Personal Information Management (PIM) tasks may require a processor to operate at a level of one Million Instructions Per Second (MIPS), while running User Interface tasks and a radio communication protocol stack simultaneously may require a processor to operate at five to ten MIPS. Another example of differing processing levels is a V.90 modem that requires approximately twice as may comparable processing cycles per unit of time (e.g., per second) as a modem which implements a slower V.34 protocol.

Typically, an electronic systems maximum capacity is designed in accordance with the greatest task envisioned by the designers and support (e.g., clock speed, operating voltage, etc.) is continuously provided at maximized levels. This often results in significant inefficiencies. For example, a power supply and clock typically continue to provide a maximum voltage power signal and a maximum frequency clock signal to a processor even when the processor is capable of performing a task at a lower frequency and voltage level. Typically, the minimum frequency and power required to adequately perform many tasks is less than the maximum designed clock frequencies and voltage power levels but the electronic system continues to supply the maximum voltage power signal and maximum frequency clock signal. For example, when a V.90 capable modem is required to operate at less than its maximum speed (e.g., due to line conditions or compatibility with another modem) the maximum operational capacity to run V.90 is not utilized by the system but support (e.g., power supply levels) is nevertheless supplied at the maximum capacity level. Continuing to provide maximum power to a device operating at less than maximum capacity wastes limited energy resources.

Traditional attempts at electronic system power conservation are typically limited to times when no processing is required and often rely on bi-static techniques that are restricted to either turning on and off a clock or power supply. For example, some traditional processing systems attempt to conserve power by starting and stopping a processor's clock when the processor is not required to be actively processing. Thus, it is typical for such devices to switch between a standby mode wherein the processor does no processing and a fully supported mode at maximum rates, even when a lesser degree of processing capability is adequate. Electronic systems often operate with a wide range of changing power requirements and traditional power conservation techniques do not maximize energy saving opportunities for varying ranges of active processing. For example, in traditional electronic processing systems the power supply continuously supports operation at the maximum rate during active processing and does not allow the device to variably throttle power consumption when the processing demands are less than maximum but greater than zero.

Some traditional power conservation techniques attempt to increase the granularity of performance control in electronic systems in which functionality is partitioned between multiple devices, subsystems or co-processors. For example, a subsystem that is not activity processing may be halted while another continues to function. This approach is still limited and fundamentally bi-static in nature with regards to any particular subsystem or co-process, the power supply continuously supports operation of the particular subsystem or coprocessor at the maximum rate and does not allow the device to variably throttle power consumption when the processing demands on the particular subsystem or co-processor are less than maximum but greater than zero. In addition, these traditional attempts compound inefficiencies by requiring extra hardware to implement each of the multiple subsystems.

As the components required to build an electronic system have reduced in size, new categories of systems have emerged. For example, one new category of computer systems is the hand held or "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few. One of the primary advantages of a palmtop computer is mobility and the power source often comprises a relatively small internal battery with a limited life and ability to supply energy. Inefficient power consumption often has significant adverse affects on the ease of use and the battery life of handheld computers.

Another issue is ease of use or the degree of user intervention required to manage power conservation or adjust processing performance. Requiring a user to manually adjust (e.g., turn on or off) a power consuming circuit, for example through the graphical user interface or the buttons of the handheld computer, is typically less preferable to automatically adjusting processing performance and controlling energy expenditure. Further, requiring a user to manually control a circuit (e.g., turning off a modem) may pose problems if the user forgets or does not readjust the controls (e.g., turn the modem on) at the appropriate time (e.g., when a communication is sent to the user).

What is required is a system and method that dynamically adjusts performance of a processor. The system and method should be flexibly adaptable to various performance capabilities between a maximum performance level and a minimum performance level. The system and method should provide relative power conservation while permitting processing to be performed.

SUMMARY OF THE INVENTION

The present invention system and method dynamically adjusts the performance of a functional circuit (e.g., processor) and is flexibly adaptable to various performance capabilities between a maximum performance level and a minimum performance level. The dynamic performance adjustment system and method of the present invention provides relative power conservation while permitting processing to be performed. In one embodiment the present invention, a dynamic performance adjustment system and method are implemented in a handheld computer.

The present invention is a dynamic performance adjustment system and method that flexibly adjusts the clock frequency and the voltage of a functional circuit to adjust its performance. In one embodiment of the present invention, a dynamic performance adjustment system and method facilitates flexible power conservation. In one exemplary implementation of the present invention, a dynamic performance adjustment control circuit controls performance adjustments to a logic circuit (e.g., a processor) and adjusts support functions (e.g., power supply) for the logic circuit. The logic circuit performs operational functions (e.g., processing) or tasks that have different performance requirements. For example, some tasks performed by the logic circuit are required to be performed in a relatively short duration and other tasks performed by logic circuit have relatively longer time limitations. In one embodiment of the present invention, the dynamic performance adjustment control circuit adjusts the frequency and voltage at which the logic circuit operates to a relatively greater frequency and voltage for tasks required to be performed in a shorter duration of time, and adjusts the frequency and voltage at which the logic circuit operates to a relatively lower frequency and voltage for tasks with longer timing tolerances. In one embodiment of the present invention, a dynamic performance adjustment system and method includes provisions to manage a transition in performance and support functions in a manner that reduces the risk of spurious signals or "glitches."

BRIEF DESCRIPTION OF THE DRAWINGS

FIG. 6 is an illustration of one embodiment of a performance determination table utilized in one embodiment of the present invention.

DETAILED DESCRIPTION OF THE INVENTION

Figure 1:
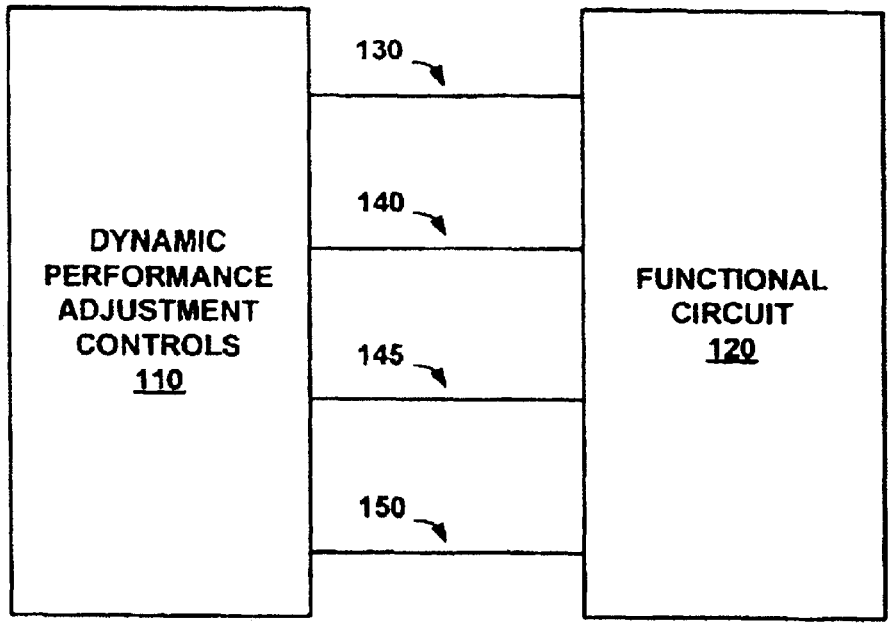
FIG. 1 is a block diagram of one embodiment of a dynamic performance circuit adjustment system of the present invention.

Reference will now be made in detail to the preferred embodiments of the invention, a system and method to dynamically adjust the performance of a processor, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is a functional circuit (e.g., a processor, analog circuit, etc.) performance adjustment system and method. The present invention facilitates adjustments to the performance of a functional circuit and support functions. A dynamic performance adjustment system and method of the present invention is capable of adjusting performance (e.g., voltage and clock speed) in a manner that provides power conservation when a task does not require a functional circuit at its maximum capability. In one embodiment of the present invention, a dynamic performance adjustment system and method determines when the maximum capacity of a functional circuit is not required to perform a task and adjusts a power supply voltage accordingly.

FIG. 1 is a block diagram of dynamic performance circuit adjustment system 100, in a accordance with one embodiment of the present invention. Dynamic performance circuit adjustment system 100 comprises dynamic-performance adjustment control circuit 110 and functional circuit 120 (e.g., a processor, modem, amplification circuit, etc.). Dynamic performance adjustment control circuit 110 controls performance adjustments to functional circuit 120 and adjustments of support functions for functional circuit 120. Functional circuit 120 performs normal operational functions (e.g., processing) or tasks. Different functions or tasks performed by functional circuit 120 have different performance requirements. For example, some tasks performed by functional circuit 120 are required to be performed in a relatively short duration of time and other tasks performed by functional circuit 120 have relatively longer time limitations.

In one embodiment of the present invention, dynamic performance adjustment control circuit 110 adjusts the frequency and voltage at which functional circuit 120 operates to a relatively greater frequency and voltage for tasks required to be performed in a shorter duration of time, and adjusts the frequency and voltage at which functional circuit 120 operates to a relatively lower frequency and voltage for tasks with longer timing tolerances. For example, dynamic performance adjustment control circuit 110 adjusts the frequency and voltage at which functional circuit 120 operates to a relatively greater frequency and voltage for tasks a higher degree of processing power, and adjusts the frequency and voltage at which functional circuit 120 operates to a relatively lower frequency and voltage for tasks requiring a lesser degree of processing power. Thus, dynamic performance adjustment control circuit 110 facilitates reductions in power consumption by reducing the voltage supplied to functional circuit 120.

In one embodiment of the present invention, dynamic performance adjustment control circuit 110 receives a performance indication signal 130 indicating the performance requirements of functional circuit 120 for a particular task. Dynamic performance adjustment control circuit 110 then makes an adjustment to a performance input signal 140 (e.g., clock signal) and/or a support signal 145 (e.g., power supply signal) to functional circuit 120 to dynamically adjust. In one exemplary implementation of the present invention, dynamic performance adjustment control circuit 110 controls an adjustment to the frequency of a performance input signal 140 (e.g., clock signal) input to functional circuit 120 and the voltage level of a support signal 145 (e.g., power supply input signal) to functional circuit 120. In one embodiment of the present invention, dynamic performance adjustment control circuit 110 stops a clock signal to functional circuit 120 and sets a functional circuit 120 power supply input signal to zero volts when functional circuit 120 is not performing operations. In one embodiment of the present invention, dynamic performance adjustment control circuit 110 comprises a processor. In one embodiment of the present invention, dynamic performance adjustment control circuit 110 comprises a state machine.

In one embodiment of the present invention, dynamic performance adjustment control circuit 110 manages adjustment timing to facilitate the reduction of errors or glitches. In one embodiment of the present invention, functional circuit 120 ceases active operations while dynamic performance adjustment control circuit 110 makes changes to performance (e.g., clock rates) and/or support functions (e.g., power supply voltages). Ceasing functional circuit 120 operations during the stabilization period reduces the risk of adverse impact from glitches or fluctuations resulting from clock generation and/or clock control circuits that generate spurious signals while changing frequencies. Similarly, preventing functional circuit 120 from performing operations during the stabilization period also reduces the risk of errors associated with changing voltages during functional circuit 120 executions, whether implemented internally or externally to an integrated circuit.

In one embodiment of the present invention, dynamic performance adjustment control circuit 110 facilitates the reduction of errors or glitches on the fly without a functional circuit ceasing operations. In some exemplary implementation the present invention comprises "glitch eaters". For example, Schmidt triggers that clean edges of a signal if they are not full magnitude or utilizing capacitor elements. Another embodiment includes a clock divider that divides a clock signal, the divide division gives more stability because additional pulses in the divided down forma are narrower and it is not as critical if there is an extra pulse. In yet another embodiment of the present invention, a first waveform is combined with a second waveform through a logic AND and generates a minimum clock period to prevent smaller pulses.

In one embodiment of the present invention, dynamic performance adjustment control circuit 110 transmits an operation control signal 150 to functional circuit 120. Operation control signal 150 directs functional circuit 120 to cease operations for a period of time sufficient to permit dynamic performance adjustment control circuit 110 to make changes to performance input signal 140 and/or support signal 145 and permit the system to stabilize. Functional circuit 120 signals dynamic performance adjustment control circuit 110 to change performance and/or support functions and then ceases active operation. After making the changes and the system has sufficiently stabilized, dynamic performance adjustment control circuit 110 transmits an operation control signal 150 notifying functional circuit 120 to resume operations.

A dynamic performance circuit adjustment system of the present invention is also applicable to variety of analog embodiments. In one exemplary implementation, a dynamic performance circuit adjustment system of the present invention is utilized in an along system (e.g., a Walkman portable radio) to adjust the operating voltage of a functional circuit (e.g., an amplifier circuit) in accordance with a performance requirement. For example, the voltage of an amplification circuit is increased to accommodate greater frequency or volume requirements and decreased to conserve power when lower frequency or volume is adequate.

Figure 2A:
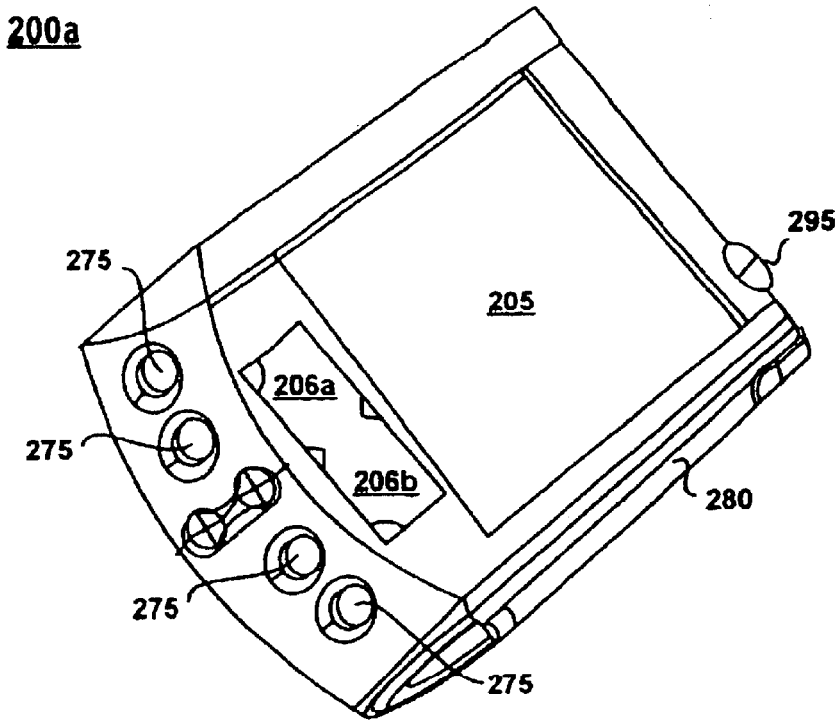
FIG. 2A is a perspective illustration of the top face of one embodiment of a hand held or palmtop computer system implementation of the present invention.

A dynamic performance circuit adjustment system is flexibly adaptable to a variety of implementations, for example a portable or palmtop computer. FIG. 2A is a perspective illustration of the top face 200a of one embodiment of a hand held or palmtop computer system. The top face 200a contains a display screen 205 surrounded by a bezel or cover. A removable stylus 280 and on/off button 295 are also shown. The display screen 205 is a touch screen able to register contact between the screen and the tip of the stylus 280. The top face 200a also contains one or more dedicated and/or programmable buttons 275 for selecting information and causing the computer system to implement functions. FIG. 2A also illustrates a handwriting recognition pad or "digitizer" containing two regions 206a and 206b. Region 206a is for the drawing of alpha characters therein for automatic recognition and region 206b is for the drawing of numeric characters therein for automatic recognition. The stylus 280 is used for stroking a character within one of the regions 206a and 206b. The stroke information is then fed to an internal processor for automatic character recognition. Once characters are recognized, they are typically displayed on the screen 205 for verification and/or modification.

Figure 2B:
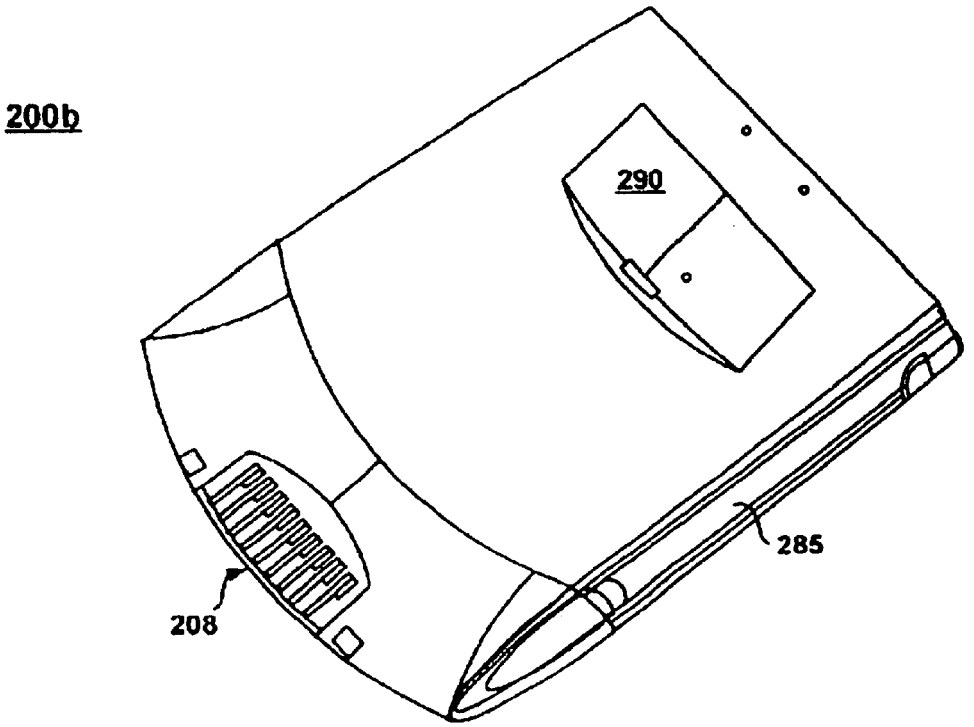
FIG. 2B illustrates the bottom side of one embodiment of a hand held or palmtop computer system implementation of the present invention.

FIG. 2B illustrates the bottom side 200b of one embodiment of a hand held or palmtop computer system. An optional extendible antenna 285, a battery storage compartment door 290, and a serial communication interface 208 are shown. Extendible antenna 285 is utilized for wireless communications (e.g., cellular phone, radio, etc). Battery storage compartment door 290 provides access for battery replacement. Serial communication interface 208 provides a communication port for communications with peripheral devices (e.g., a palm cradle, landline phone modem, etc.).

Figure 3:
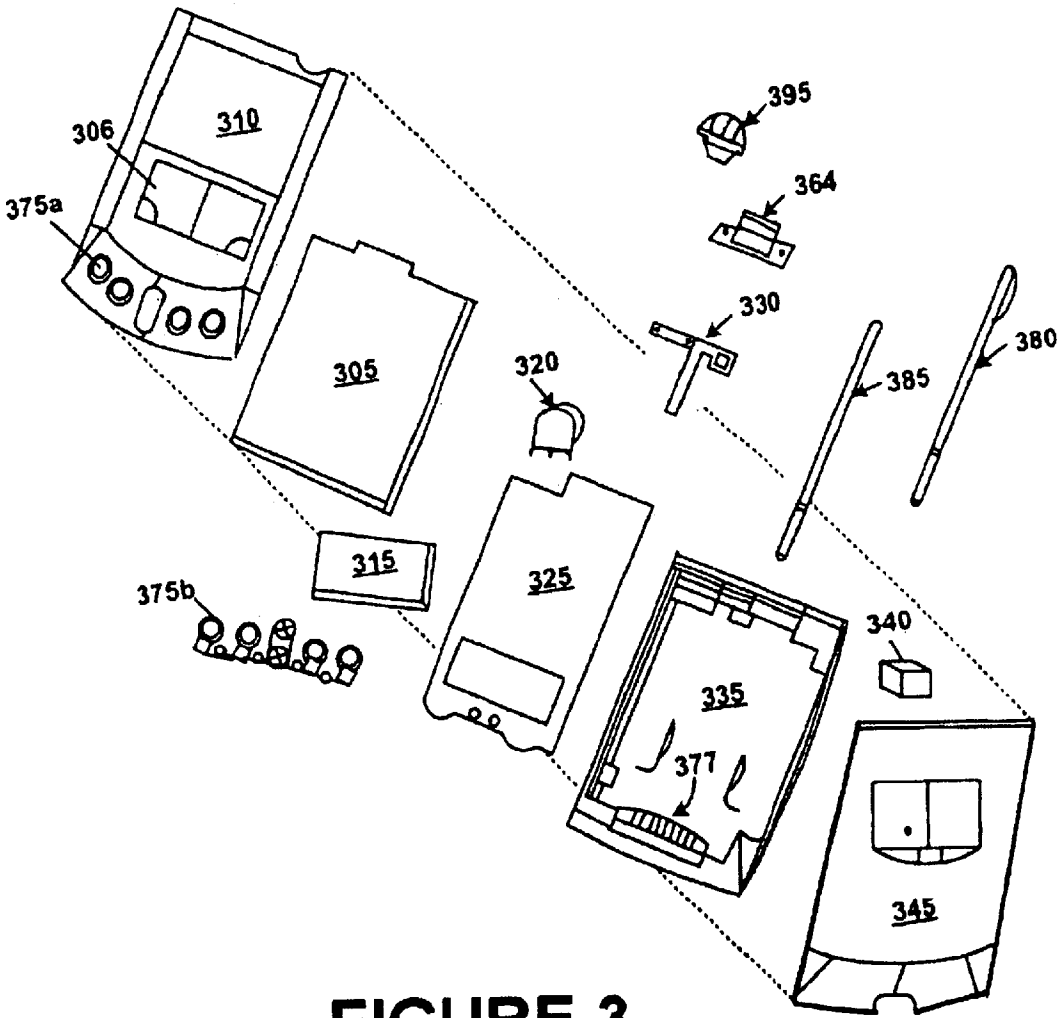
FIG. 3 is an exploded view of a hand held computer system in accordance with one implementation of the present invention.

FIG. 3 is an exploded view of the hand held computer system 300 in accordance with one implementation of the present invention. Hand held computer system 300 includes front cover 310 having an outline of region 306 and holes 375a for receiving buttons 375b. A flat panel display 305 (both liquid crystal display and touch screen) fits into front cover 310. Any of a number of display technologies can be used (e.g., LCD, FED, plasma, etc.) for the flat panel display 305. A battery 315 provides electrical power. A contrast adjustment (potentiometer) 320 is also shown. On/off button 395 is shown along with an infrared emitter and detector device 364. A flex circuit 330 is shown along with a PC board 325 containing electronics and logic (e.g., memory, communication bus, processor, etc.) for implementing computer system functionality. The digitizer pad is also included in PC board 325. A midframe 335 is shown along with stylus 380.

Hand held computer system 300 is capable of communicating with other devices. Position adjustable antenna 385 for transmitting and receiving communication signals is shown. A radio receiver/transmitter device 340 is also shown between the midframe and the rear cover 345 of FIG. 3. The receiver/transmitter device 340 is coupled to the antenna 385 and also coupled to communicate with the PC board 325. In one implementation of the present invention, the Mobitex wireless communication system is used to provide two way communication between system 300 and other networked computers and/or the Internet via a proxy server. Communication interface 377 is coupled to PC board 325 and provides a communications port (e.g., a serial port) for communicating signals to and from a peripheral device.

Figure 4:
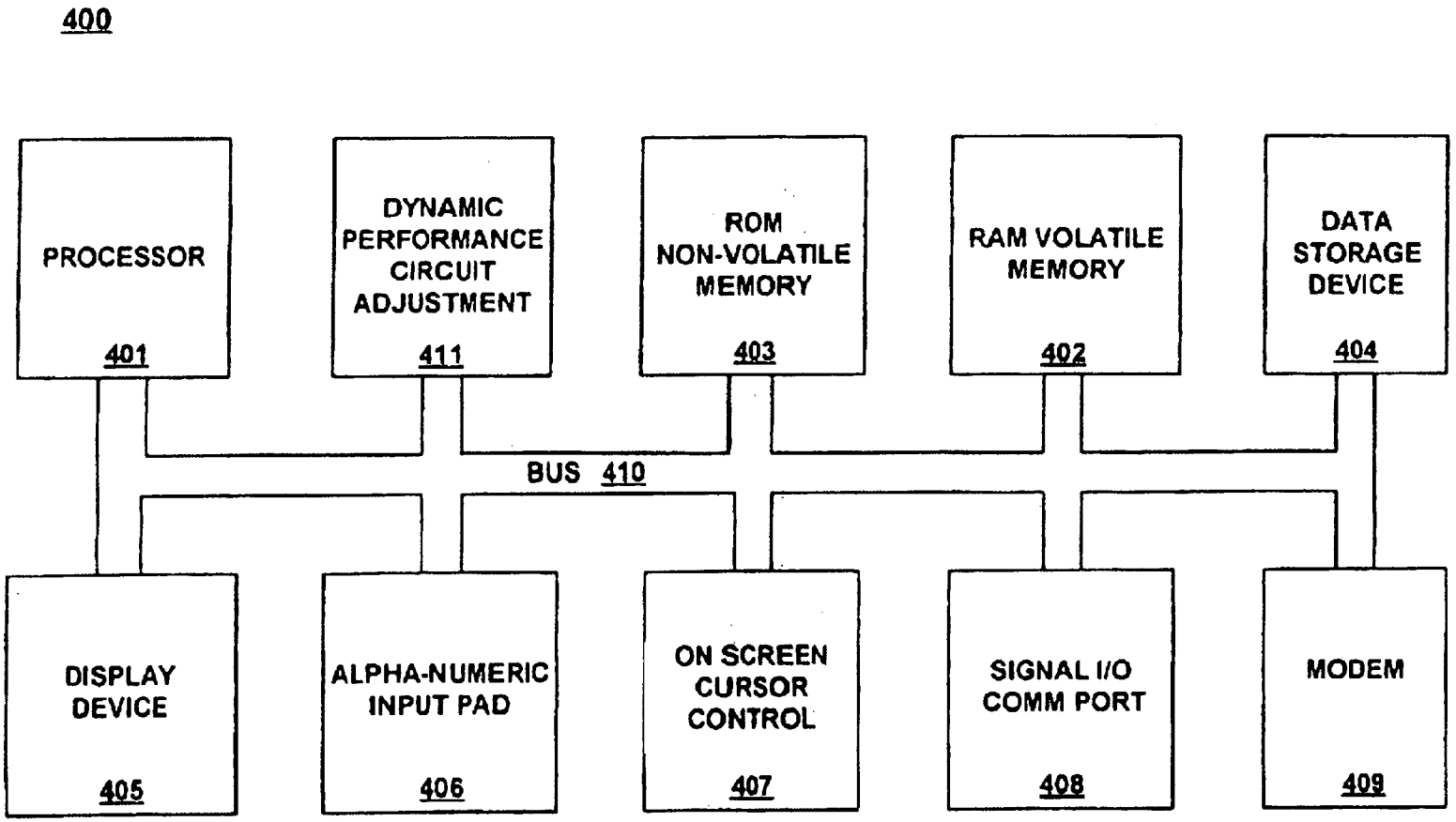
FIG. 4 is a block diagram of a computer system included in one embodiment of the present invention.

FIG. 4 is a block diagram of computer system 400, some of which is implemented on PC board 325. Computer system 400 includes address/data bus 410, central processor 401, volatile memory 402 (e.g., random access memory RAM), non-volatile memory 430 (e.g., read only memory ROM), optional removable data storage device 404 (e.g., memory stick), display device 405, optional alphanumeric input device 406, optional cursor control or directing device 407, and signal communication port 408, modem 409 and main dynamic control adjustment circuit 110. Address/data bus 410 is coupled to central processor 401, volatile memory 402 (e.g., random access memory RAM), non-volatile memory 403 (e.g., read only memory ROM), optional removable data storage device 404 (e.g., memory stick), display device 405, optional alphanumeric input device 406, optional cursor control or directing device 407, and signal communication port 408, modem 409 and main dynamic control adjustment circuit 110. In one embodiment of the present invention, central processor 401 includes main dynamic control adjustment circuit 110.

The components of computer system 400 cooperatively function to provide a variety of functions, including PIM, communications, etc. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Optional removable data storage device 404 (e.g., memory stick) also stores information and instructions. Display device 405 displays information to the computer user and an optional alphanumeric input device 406 is an input device, which in one implementation is a handwriting recognition pad ("digitizer") having regions 306a and 306b (see FIG. 3A). Optional directing device 407 also communicates user input information and command selections to the central processor 401 via a touch screen capable of registering a position on the screen 405 where the stylus makes contact. Signal Communication port 408 is a communication interface (e.g., serial communications port 308) for communicating signals to and from a coupled peripheral device (not shown). Modem 409 facilitates communications with other devices. Main dynamic control adjustment circuit 110 controls adjustment to the performance of other components (e.g., processor 410, modem 409, etc.) and comprises a variety of configurations in different implementations. In one embodiment of the present invention, main dynamic control adjustment circuit 110 controls adjustments to the support functions (e.g., power supplies) to other components.

Figure 5:
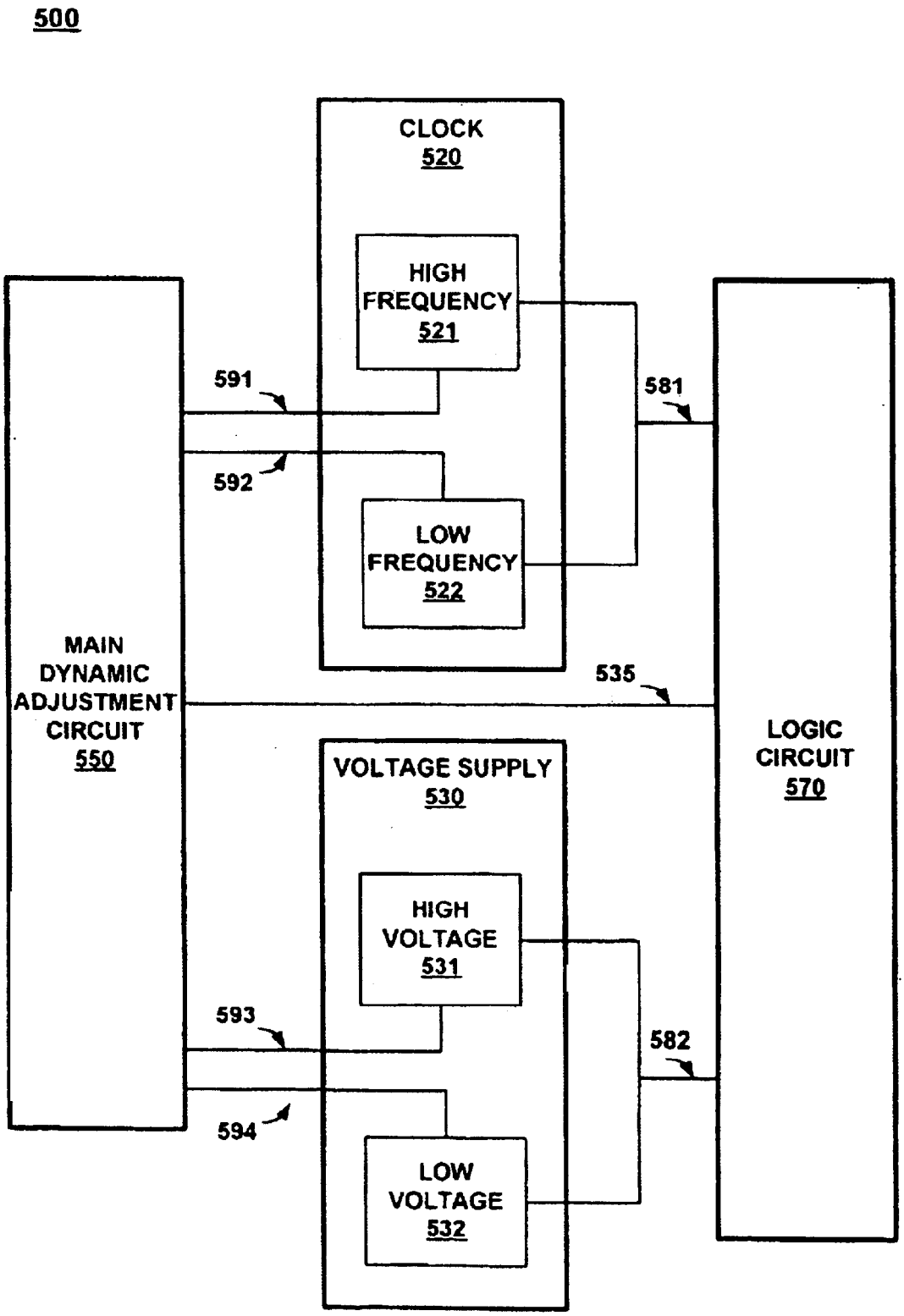
FIG. 5 is a block diagram of one embodiment of a dynamic performance circuit adjustment system of the present invention implemented in a palm computer system.

FIG. 5 is block diagram of dynamic performance circuit adjustment system 500 in accordance with one embodiment of the present invention. In one embodiment of the present invention, dynamic performance circuit adjustment system 500 is implemented in palm computer system 300. Dynamic performance circuit adjustment system 500 comprises main dynamic adjustment control circuit 550, clock circuit 520, voltage supply circuit 530, and logic circuit 570. Clock circuit 520 comprises a high frequency output 521 and a low frequency output 522. Voltage supply circuit 530 comprises high voltage output 531 and low voltage output 532. Main dynamic adjustment control circuit 550 is coupled to clock circuit 520, voltage supply circuit 530, and logic circuit 570. Logic circuit 570 is coupled to clock circuit 520, voltage supply circuit 530.

The components of dynamic performance circuit adjustment system 500 cooperatively operate to provide flexible dynamic performance adjustment of logic circuit 570. Logic circuit 570 performs operational functions (e.g., processing) or tasks. Clock circuit 520 supplies a clock signal 581 to logic circuit 570. Clock signal 581 is a first relatively high frequency or second relatively low frequency depending upon whether high frequency output 521 or low frequency output 522 is enabled. Voltage supply circuit 530 supplies a power signal 582 to logic circuit 570. Power signal 582 is a first relatively high voltage or a second relatively low voltage depending upon whether high voltage output 521 or low voltage output 532 are enabled. Main dynamic adjustment control circuit 550 controls adjustments to the performance of logic circuit 570. For example, main dynamic adjustment control circuit 550 enables either high frequency output 521 via high frequency enable signal 591 or low frequency output 522 via low frequency enable signal 592. Similarly main dynamic adjustment control circuit 550 enables either high voltage output 531 via high voltage enable signal 593 or low voltage output 532 via low voltage enable signal 594. At lower voltage settings, dynamic performance circuit adjustment system 500 facilitates power conservation.

A dynamic performance adjustment power control system of the present invention provides a significant degree of flexibility in adjusting performance (e.g., computation performance or speed of a processor). A dynamic performance adjustment power control system of the present invention is easily expanded to provide greater granularity of control. For example, in one embodiment of the present invention a clock circuit has numerous different frequency outputs that are controlled by a main dynamic performance adjustment control circuit. Similarly, in one embodiment of the present invention a power supply has numerous different voltage outputs (e.g., 5 volts, 3.3 volts, 2 volts, 0 volts, etc.) that are controlled by a main dynamic performance adjustment control circuit. Dynamic performance circuit adjustment system 500 "throttles" between the different voltage outputs depending upon performance requirements to conserve power when less than maximum performance is required.

In one embodiment of the present invention, a main dynamic performance adjustment control circuit disables a clock signal and/or a power signal to logic circuit 570. Main dynamic adjustment control circuit 550 (FIG. 5) disables both high frequency output 521 and low frequency output 522 turning off the clock signal to logic circuit 570. Similarly, main dynamic adjustment control circuit 550 also disables both high voltage output 531 and low voltage output 532 reducing power supplied to logic circuit 570.

A dynamic performance adjustment control circuit (e.g., main dynamic adjustment control circuit 550 shown in FIG. 5) comprises a variety of configurations or embodiments. For example, a dynamic performance adjustment control circuit comprises a processor in one embodiment of the present invention. In another exemplary implementation, the dynamic performance adjustment control circuit comprises a state machine. The dynamic performance adjustment control circuit dynamically adjusts the performance of a logic circuit (e.g., a processor) based upon the requirements of a particular task. In one exemplary implementation of the present invention, the dynamic performance adjustment control circuit determines an optimized clock rate and power supply voltage based upon the particular task to be performed by the logic circuit. In one embodiment, a processor included in a dynamic performance adjustment control circuit utilizes a hash table to determine appropriate performance controls and support functions.

FIG. 6 is an illustration of performance determination table 600 that can be used in one embodiment of the present invention. Performance determination table 600 tracks seven different tasks performed by a logic circuit and provides a correlation to their associated performance and support requirements. A first task requires maximum frequency and voltage and a processor in dynamic performance adjustment control circuit signals a frequency supply and voltage supply to provide a maximum frequency and voltage to the logic circuit. A second and sixth task require a relatively high frequency and voltage and a processor in dynamic performance adjustment control circuit signals a frequency supply and voltage supply to provide a relatively high frequency and voltage to the logic circuit. A third and seventh task require a relatively low frequency and voltage and a processor in dynamic performance adjustment control circuit signals a frequency supply and voltage supply to provide a relatively low frequency and voltage to the logic circuit. A forth task does not require maximum capacity of the logic circuit, however the performance is optimized by providing a maximum frequency and voltage for a period of time and turning off a frequency and voltage supply after the task is performed. The dynamic performance adjustment control circuit turns the frequency supply and power supply on when another task is required. A fifth task does not require the logic circuit to perform any functions and the dynamic performance adjustment control circuit turns off a frequency supply and voltage supply until the logic circuit is required to perform another task.

The present invention is very flexible in managing power consumption and facilitates the weighing of a number of factors in controlling the performance of a logic circuit such as a processor. One exemplary embodiment of the present includes a hash table in which multiple factors weighed in determining a task number. For example, a particular functional task may have a higher priority at times and a lower priority at others. The functional task is assigned different task numbers in the hash table according to the priority requirements, a higher priority task is assigned a task number associated with performing the functional task quickly (e.g., task number 4) and a lower priority task is assigned another task number associated with performing the functional task slower (e.g. task number 3).

In one embodiment of the present invention, the dynamic performance adjustment control circuit adjusts the performance of a processor in a modem in accordance with an appropriate communication rate. In this exemplary implementation, a modem initiates a communication session by engaging in a handshaking protocol in which a communication rate is negotiated based upon a number of parameters (e.g., the maximum baud rates of the modems on each end, line conditions, etc.). The negotiated communication rate is supplied to the dynamic performance adjustment control circuit. Based upon the negotiated communication rate the dynamic performance adjustment control circuit determines the optimal modem processor rate. The optimal processor rate is the lowest rate at which the modem processor adequately services a negotiated communication rate.

In one exemplary implementation of the present invention, the dynamic performance adjustment control circuit adjusts the performance of a processor in a modem that normally operates at a maximum 56K bits per second (bps). The modem processor requires a clock signal at a relatively high frequency to service the 56 Kbps rate. The dynamic performance adjustment control circuit enables a relativity high frequency output of a clock circuit and a relatively high voltage output of a power supply. However, if the negotiated communication rate is 28.8 Kpbs, the modem processor is capable servicing the 28.8 Kbps rate based upon a clock signal at a relatively low frequency and a dynamic performance adjustment control circuit enables a relatively low frequency output of a clock circuit and a relatively low voltage output of a power supply. In one embodiment of the present invention, a dynamic performance adjustment control circuit disables all clock outputs and power supply outputs when the modem is not actively engaged in transmitting or receiving data.

Figure 7:
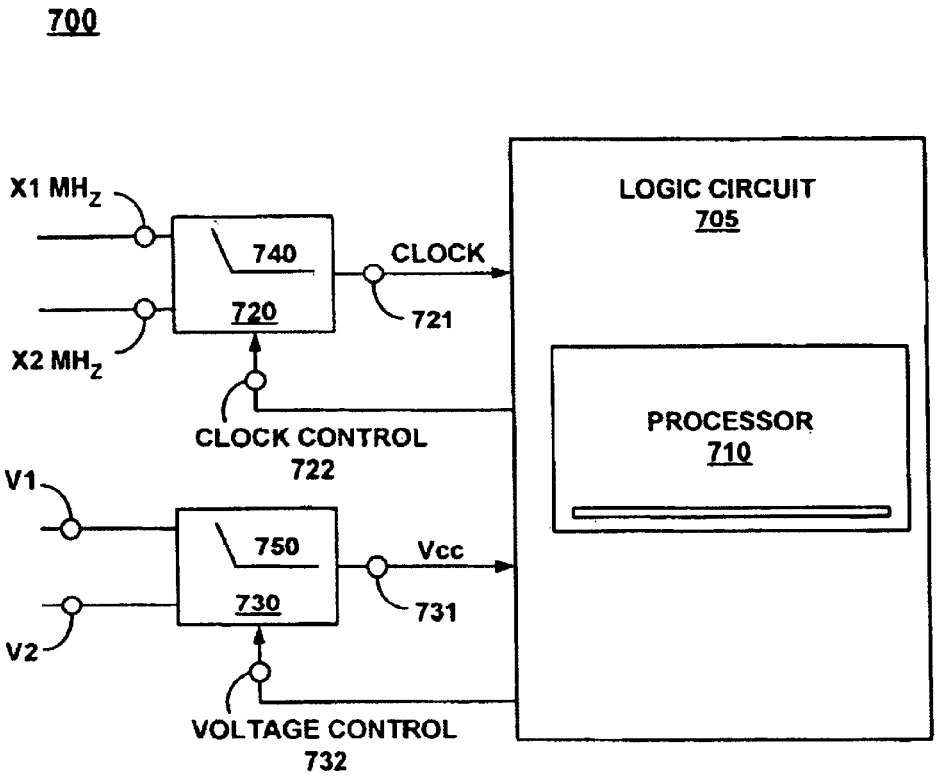
FIG. 7 is an illustration of one embodiment of a dynamic performance circuit adjustment system of the present invention in which a processor in a controlled logic circuit also provides performance control processing functions.

One embodiment of the present invention utilizes a processor included in the logic circuit to perform a dynamic performance adjustment control circuit. FIG. 7 is an illustration of dynamic performance circuit adjustment system 700. Dynamic performance circuit adjustment system 700 comprises logic circuit 705, clock control switch 740 and power supply switch 750. Logic circuit 705 is coupled to clock control switch 740 and power supply switch 750. Logic circuit 705 comprises processor 710 which performs operational functions or tasks as well as providing and dynamic adjustment control processing. The dynamic adjustment control processing issues a clock control signal 722 to clock control switch 740 and a voltage control signal 732 to power supply switch 750. Clock control signal 722 controls whether clock control switch selects to transmit X1 Mhx or X2 Mhz signal as clock signal 721. Voltage control signal 732 controls whether power supply switch selects to transmit V1 voltage signal or V2 voltage signal as power supply signal Vcc 731.

In one embodiment, 700, logic circuit 705 comprises a power control state machine (not shown) adjacent to processor 710. The power control state machine (not shown) is included in the same integrated circuit (IC). The power control state machine resists errors caused by changing support functions (e.g., voltage of a power supply signal) and/or performance (e.g., a clock rate). Processor 710 signals the power control state machine to change operating condition (s) and then the processor 710 ceases active operation. The power control state machine waits a predetermined time period (e.g., number of clock cycles) and then initiate and control the changes. In one embodiment of the present invention, after a second predetermined time sufficient to permit the clock generator and/or voltage generator to stabilize, the power control state machine signals processor 710 to resume active operation.

Figure 8:
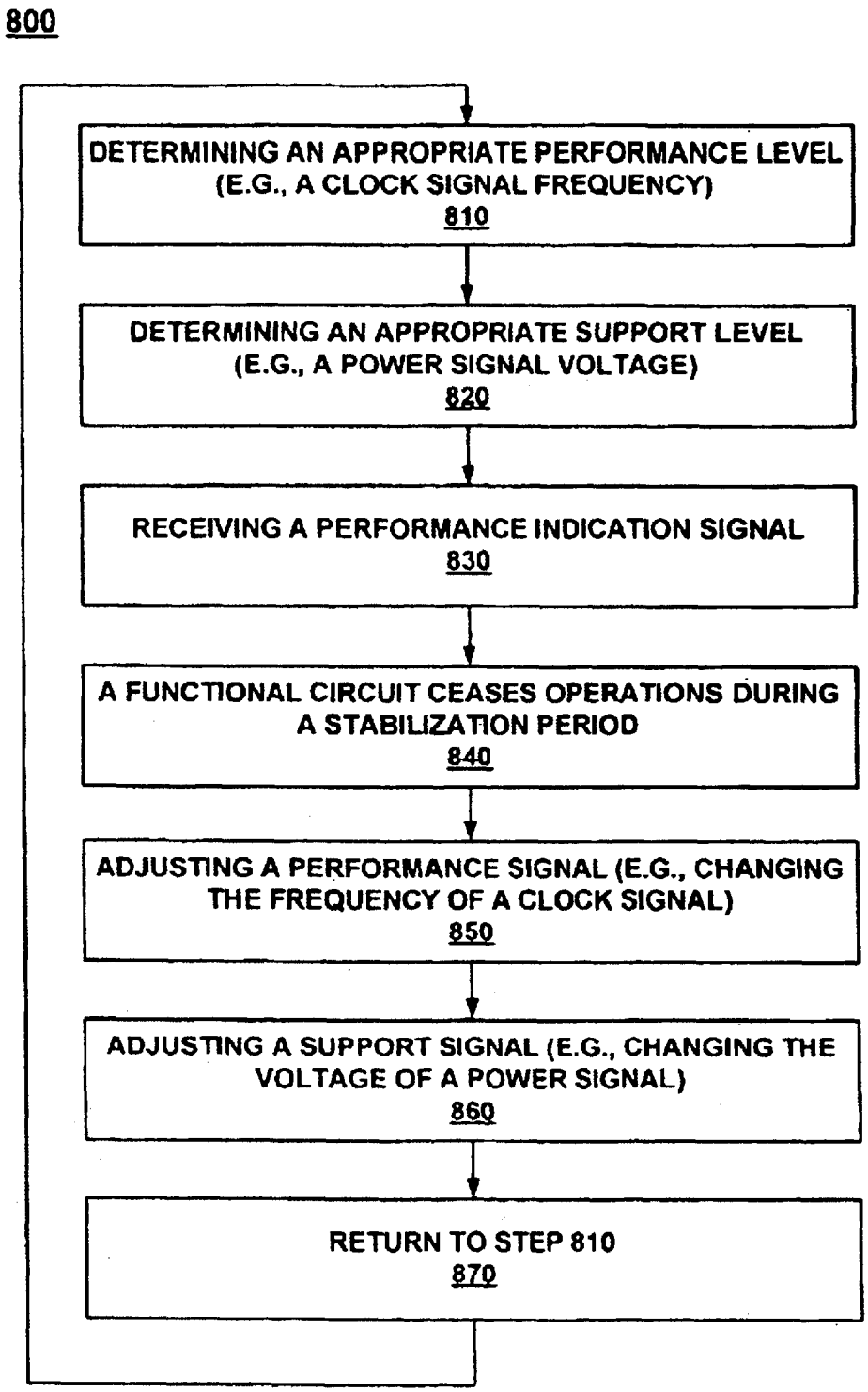
FIG. 8 is a block diagram of one embodiment of a dynamic performance circuit adjustment method of the present invention.

FIG. 8 is a block diagram of dynamic performance circuit adjustment method 800, in accordance with one embodiment of the present invention. Dynamic performance circuit adjustment method 800 provides flexible control of a functional circuit by facilitating adjustments to the performance of a functional circuit (e.g., a digital processor, analog amplifier, etc.) and support functions (e.g., power signals). Dynamic performance circuit adjustment method 800 is capable of adjusting performance in a manner that provides power conservation when a functional circuit is required to actively execute tasks at a rate lower than its maximum capability.

In step 810, an appropriate performance level (e.g., processing frequency, communication rate, etc.) is determined. In one embodiment of the present invention, the minimum level (e.g., frequency, voltage, etc.) at which a functional circuit adequately performs a task, (e.g., processing, modem communication, etc.) is considered an appropriate performance level. In exemplary implementation, an appropriate performance level is to operate at maximum capacity for a period of time and then throttle back for a period of time.

In step 820, an appropriate support level (e.g., voltage of a power supply signal) is determined. In one embodiment of the present invention, an appropriate voltage level of a power supply signals is determined based upon the frequency of a clock signal. For example, the higher the frequency of a clock signal the higher the appropriate voltage level of a power supply signal.

In step 830, a performance indication signal (e.g., performance indication signal 130) is received. The performance indication signal indicates the performance requirements of a functional circuit (e.g., functional circuit 120) for a particular task. In one embodiment of the present invention, a performance indication signal indicates a negotiated communication rate (e.g., a modem communication rate) or the speed at which a processor operates to adequately accommodate a negotiated communication rate.

In Step 840, a functional circuit ceases operations during a stabilization period. In one embodiment of dynamic performance circuit adjustment method 800, a functional circuit is directed to cease operations for a period of time sufficient to permit a dynamic performance adjustment control circuit to make changes to a performance input signal (e.g., a clock signal) and a support signal (e.g., a power signal) and permit the system to stabilize. Dynamic performance circuit adjustment method 800 makes changes to clock rates and or operating voltages while a functional circuit is not actively operating. A function circuit ceases operations for a predetermined period of time.

In step 850, a performance signal is adjusted. For example, the clock signal frequency can be adjusted by performance circuit adjustment method 800. In one embodiment of the present invention, the clock signal frequency is adjusted by enabling a first relatively high frequency clock output (e.g., turning on a relatively high frequency clock or making adjustments in clock multiplier or divider). The clock signal frequency can be adjusted by enabling a second relatively low frequency clock output (e.g., turning on a relatively low frequency clock or making adjustments in clock multiplier or divider). In one embodiment of the present invention, a performance signal is adjusted by switching between a low frequency source and a high frequency source.

In step 860, a support signal is adjusted. In one exemplary implementation of the present invention, a power signal voltage is adjusted by performance circuit adjustment method 800. The power signal voltage is adjusted by enabling a first relatively high voltage signal output (e.g., turning on a relatively high voltage source or making). In one embodiment of the present invention, the power signal voltage is adjusted by enabling a second relatively low voltage signal output (e.g., turning on a relatively low voltage source). A power signal is adjusted by switching between a low voltage source and a high voltage source. In one embodiment of the present invention, enabling a second relatively low voltage signal output or switching to a low voltage source conserves power.

In step 870 the process returns to step 810.

Figure 9:
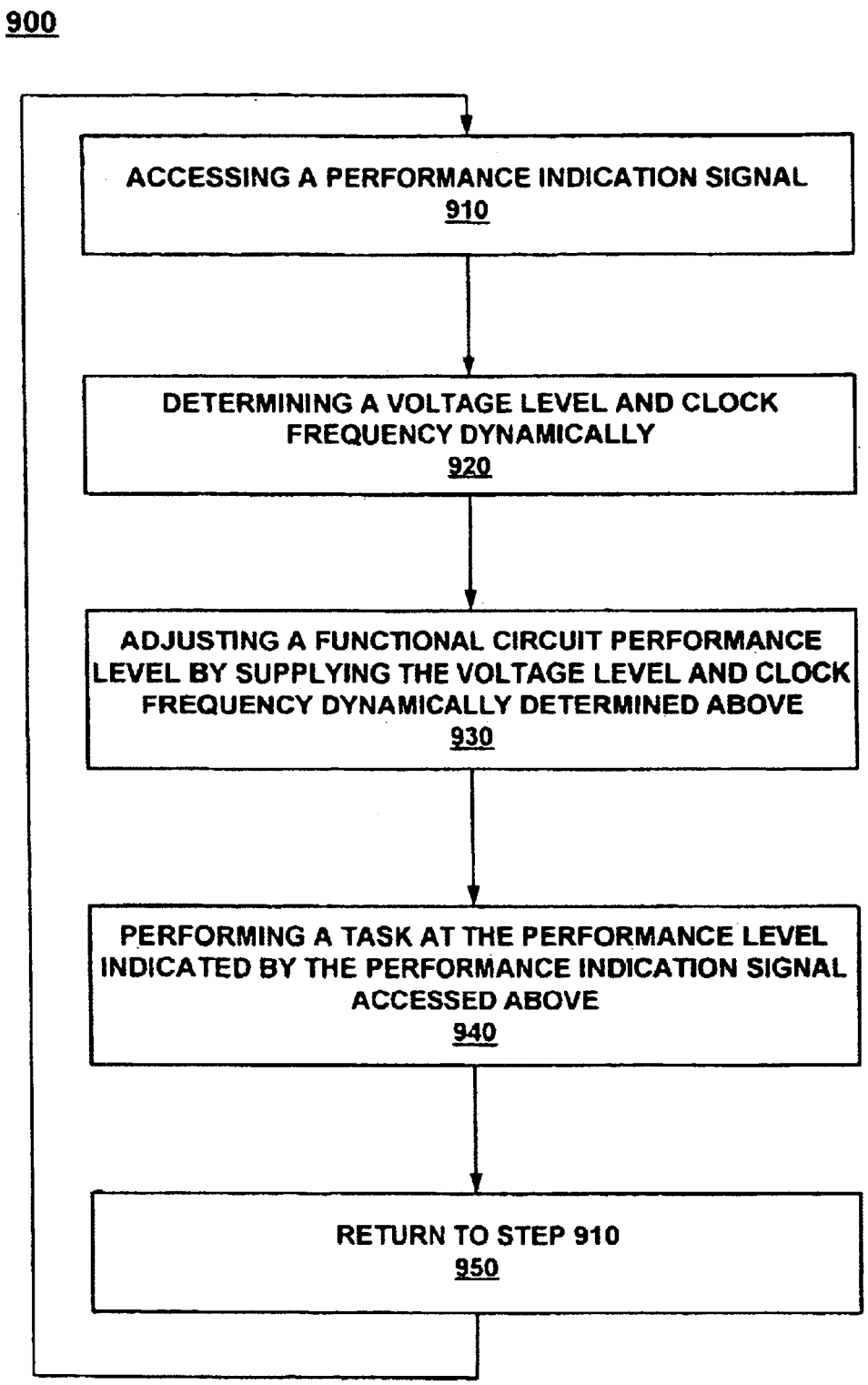
FIG. 9 is a flow chart of one exemplary present invention dynamic adjustment method for dynamically adjusting the performance of a functional circuit.

FIG. 9 is a flow chart of dynamic adjustment method 900, a present invention method of dynamically adjusting the performance of a functional circuit. In one embodiment of the present invention, utilizing dynamic adjustment method 900 to adjust performance facilitates power conservation. For example, dynamic adjustment method 900 adjusts the frequency at which a functional circuit performs and changes the voltage level of a power supply signal accordingly to support the frequency change. Thus, dynamic adjustment method facilitates power conservation during tasks requiring a lower voltage power signal.

In Step 910, a performance indication signal is accessed. The performance indication signal provides an indication of an adequate or desired performance level of a functional circuit (e.g., functional circuit 120)

In Step 920 a voltage level and clock frequency are dynamically determined based upon the performance signal accessed in Step 910. For example, a clock frequency and power supply voltage level are set to a maximum value if a performance indication signal indicates the functional circuit.

In Step 930 a functional circuit performance level is dynamically adjusted by supplying the voltage level and clock frequency dynamically determined in Step 920. In one embodiment of the present invention, different voltage level power signals and clock frequency signals are selectively enabled. In one implementation, dynamic adjustment method 900 switches between different voltage level power signals and clock frequency signals. A functional circuit to cease operations for a period of time sufficient to permit a functional circuit to stabilize before a performance level adjustment.

In Step 940, a functional circuit performs a task at the performance level indicated by the performance indication signal accessed in Step 910. In one exemplary implementation a processor performs computations at a frequency slower than its maximum permitting it to operate at a voltage level less than its maximum and thus conserves power.

In Step 950 the process returns to Step 910.

Thus, the present invention system and method dynamically adjusts the performance of a functional circuit (e.g., processor) and is flexibly adaptable to various performance capabilities between a maximum performance level and a minimum performance level. The dynamic performance adjustment system and method of the present invention provides relative power conservation while permitting processing to be performed. The present invention is adaptable to a variety of implementations, for example a handheld palm computer. In one exemplary implementation, the present invention is utilized to control performance and functional support adjustments to a functional circuit comprising analog components. In one embodiment of the present invention, a dynamic performance adjustment control circuit controls adjustments to operating voltages of an amplification circuit of a Walkman portable radio as frequency and/or loudness requirements change.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A dynamic performance circuit adjustment system comprising:

a functional circuit for performing operational tasks that have differing minimum performance and support function requirements; and a dynamic performance adjustment control circuit for controlling performance adjustments to said functional circuit and adjustments to support functions for said functional circuit, said dynamic performance adjustment control circuit coupled to said functional circuit, wherein said dynamic performance adjustment control circuit:

a) adjusts the frequency and voltage at which said functional circuit operates to a relatively greater frequency and voltage for tasks required to be performed in a shorter duration of time, b) adjusts the frequency and voltage at which said functional circuit operates to a relatively lower frequency and voltage for tasks with longer timing tolerance, and c) transmits an operation control signal to said functional circuit directing said functional circuit to cease operations for a period of time sufficient to permit said dynamic performance adjustment control circuit to make changes to said performance input signal and said support signal and permit the system to stabilize.

2. The dynamic performance circuit adjustment system of claim 1 wherein said dynamic performance adjustment control circuit receives a performance indication signal indicating said minimal performance requirements of said functional circuit for a particular one of said tasks.

3. The dynamic performance circuit adjustment system of claim 2 wherein said dynamic performance adjustment control circuit makes an adjustment to a performance signal and a support signal for said functional circuit in accordance with said performance indication signal indicating.

4. The dynamic performance circuit adjustment system of claim 1 wherein said dynamic performance adjustment control circuit stops a clock signal to said functional circuit and sets a power supply signal to said functional circuit at zero volts when said functional circuit is not actively performing operation.

5. The dynamic performance circuit adjustment system of claim 1 wherein said functional circuit signals said dynamic performance adjustment control circuit to adjust performance and support functions for said functional circuit and said functional circuit ceases active operation for a period of time sufficient to permit said dynamic performance adjustment control circuit to make changes to said performance input signal and said support signal and permit the system to stabilize.

6. A dynamic performance circuit adjustment system implemented in a [palm] *mobile* computer system comprising;

a logic circuit for performing operational functions or tasks;

a clock circuit for supplying a clock signal to said logic circuit, said clock circuit coupled to said logic circuit;

a voltage supply circuit for supplying a power signal to said logic circuit, said voltage supply circuit coupled to said logic circuit; and a main dynamic adjustment control circuit for controlling the performance of said logic circuit by varying a frequency of said clock signal and by varying the voltage of said power signal, wherein said main dynamic adjustment control circuit signals said logic circuit to cease active operations for a period of time sufficient to permit said dynamic performance adjustment control circuit to make changes to said frequency and said voltage and [and] permit the system to stabilize, said main dynamic adjustment control circuit coupled to said logic circuit.

7. The dynamic performance circuit adjustment system of claim 6 wherein said clock circuit further comprises:

a high frequency output for supplying a first relatively high frequency signal; and a low frequency output for supplying a second relatively low frequency signal.

8. The dynamic performance circuit adjustment system of claim 6 wherein said voltage supply circuit further comprises:

a high voltage output for supplying a first relatively high voltage signal; and a low voltage output for supplying a first relatively low voltage signal.

9. The dynamic performance circuit adjustment system of claim 6 wherein said main dynamic adjustment control circuit selectively enables a high frequency output via a high frequency enable signal and a low frequency output via a low frequency enable signal.

10. The dynamic performance circuit adjustment system of claim 6 wherein said main dynamic adjustment control circuit selectively enables a high voltage output via a high voltage enable signal and a low voltage output via a low voltage enable signal.

11. The dynamic performance circuit adjustment system of claim 6 wherein said performance adjustment control circuit disables a clock signal and a power signal to logic circuit.

12. A dynamic performance circuit adjustment method comprising the steps of:

a) accessing a performance indication signal;

b) based upon said performance indication signal, dynamically determining a voltage level and a clock frequency;

c) supplying said voltage level and said clock frequency to [said] *a* functional circuit to dynamically adjust its performance level and directing functional operations to cease for a period of time sufficient to permit stabilize before adjusting said performance level;

d) performing a task using said [factional] *functional* circuit; and e) repeating steps a) through d).

13. A method of claim 12 further comprising the step of ceasing functional circuit active operation during stabilization period.

14. A method of claim 12 further comprising the steps of:

c1) selecting a first relatively high frequency clock output; and c2) selecting a second relatively low frequency clock output.

15. A dynamic performance circuit adjustment method of claim 12 wherein step c) further comprises the step of switching between a low frequency source and a high frequency source.

16. A method of claim 12 wherein step c) further comprises the steps of:

enabling a first relatively high voltage signal output; and enabling a second relatively low voltage signal output.

17. A method of claim 12 wherein step c) further comprises the step of switching between a low voltage source and a high voltage source.

* * * * *